(12) United States Patent
Shuai

(10) Patent No.: US 12,507,481 B2
(45) Date of Patent: Dec. 23, 2025

(54) DISPLAY MODULE AND MOBILE TERMINAL

(71) Applicant: Wuhan China Star Optoelectronics Technology Co., Ltd., Hubei (CN)

(72) Inventor: Chuan Shuai, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 377 days.

(21) Appl. No.: 18/034,155

(22) PCT Filed: Mar. 31, 2023

(86) PCT No.: PCT/CN2023/085667
§ 371 (c)(1),
(2) Date: Apr. 27, 2023

(87) PCT Pub. No.: WO2024/119679
PCT Pub. Date: Jun. 13, 2024

(65) Prior Publication Data
US 2024/0321898 A1    Sep. 26, 2024

(30) Foreign Application Priority Data

Dec. 7, 2022 (CN) .......................... 202211566971.3

(51) Int. Cl.
*H10D 86/60* (2025.01)
*G06F 3/046* (2006.01)
(Continued)

(52) U.S. Cl.
CPC .............. *H10D 86/60* (2025.01); *G06F 3/046* (2013.01); *H01L 25/0753* (2013.01);
(Continued)

(58) Field of Classification Search
None
See application file for complete search history.

(56) References Cited

U.S. PATENT DOCUMENTS

2007/0216845 A1   9/2007  Liao
2024/0036693 A1*  2/2024  Shuai .................. G06F 3/03545

FOREIGN PATENT DOCUMENTS

CN    113735460    12/2021
CN    114185451    3/2022
(Continued)

OTHER PUBLICATIONS

International Search Report and the Written Opinion Dated Aug. 14, 2023 From the International Searching Authority Re. Application No. Re. Application No. PCT/CN2023/085667 and its Translation of the Search Reoprt into English. (16 Pages).

*Primary Examiner* — Bo B Jang

(57) ABSTRACT

A display module and a mobile terminal are provided. The display module includes a metal wiring layer, the metal wiring layer includes a plurality of wiring units, and a first wiring layer in the metal wiring layer includes a first gap between adjacent metal wiring. A ratio of an area of the first gap in the wiring unit to an area of the wiring unit is set to be greater than 1%. A problem where an electromagnetic induction signal generated by a second electromagnetic wiring is shielded by a whole metal surface formed due to closely arranging of metal wirings in the light-emitting backplane is effectively avoided.

20 Claims, 10 Drawing Sheets

(51) Int. Cl.
*H01L 25/075* (2006.01)
*H01L 25/16* (2023.01)
*H10D 86/40* (2025.01)
*H10H 20/857* (2025.01)

(52) U.S. Cl.
CPC ......... *H01L 25/167* (2013.01); *H10D 86/441* (2025.01); *H10H 20/857* (2025.01)

(56) References Cited

FOREIGN PATENT DOCUMENTS

| | | |
|---|---|---|
| CN | 114879393 | 8/2022 |
| CN | 114967263 | 8/2022 |

\* cited by examiner cross-section along first direction X cross-section along second direction Y cross-section along first direction X cross-section along second direction Y

DISPLAY MODULE AND MOBILE TERMINAL

RELATED APPLICATIONS

This application is a National Phase of PCT Patent Application No. PCT/CN2023/085667 having International filing date of Mar. 31, 2023, which claims the benefit of priority of Chinese Patent Application No. 202211566971.3 filed on Dec. 7, 2022. The contents of the above applications are all incorporated by reference as if fully set forth herein in their entirety.

FIELD AND BACKGROUND OF THE INVENTION

The present application relates to a field of display technology, and more particularly, to a display module and a mobile terminal thereof.

In a field of medium and small size display, integration technology has become current focus of research and development, that is, focus on integrating functions into a display panel by development of related technologies. Integration technology can ensure that a thickness of the display panel is not increased and no function is removed. The integration technology of the display panel may bring many derived additional functions to the display panel, so that the display panel gradually transitions from a simple display interface to a comprehensive perceived, interactive interface. Most of current mainstream interactive stylus technologies are based on capacitive touch, which is low in cost. However, large differences in the amount of charge required for capacitive touch result in a large pen head, and problems such as poor writing experience, high time delay, and low precision. These problems limit the development of the interactive stylus technologies in professional fields such as painting. The electromagnetic touch has good writing experience, low time delay, high precision, and is very suitable for a stylus with various functional requirements.

Currently, some technologies have adopted a design of integrated backlight and Electro Magnetic Resonance technology (EMR) of mini LED, and a space of the backlight of the mini LED is fully used. The backlight integrates EMR touch function, and the space in the display panel integrated with the touch function is saved. However, metal wirings of the backlight of the mini LED are wide in shape. Although the thickness of the display panel is reduced after integrating, a large-area metal is formed in the space of the backlight. The large-area metal has a risk of shielding a part of an electromagnetic induction signal, resulting in reducing amount of the electromagnetic induction signal of the display panel in whole and narrowing a range of touch control.

SUMMARY OF THE INVENTION

An embodiment of the present application provides a display module and a mobile terminal thereof, which can effectively avoid the problem that a large-area metal is formed by densely arranging an electromagnetic wiring and a light-emitting signal line in a same layer of a light-emitting backplane, thereby leaving an insufficient hollow area on the large-area metal, and shielding some electromagnetic signals easily.

To solve the above problems, the present application provides the following technical solutions.

An embodiment of the present application provides a display module comprising a light-emitting backplane, wherein the light-emitting backplane comprises:
a substrate;
a metal wiring layer disposed on the substrate, wherein the metal wiring layer comprises a plurality of metal wiring lines, the plurality of metal wiring lines comprises a plurality of first electromagnetic induction coils arranged in a first direction, a plurality of second electromagnetic induction coils arranged in a second direction, and a plurality of light-emitting signal lines; wherein the plurality of light-emitting signal lines comprises a plurality of first light-emitting signal lines; wherein each of the plurality of first electromagnetic induction coils comprises at least two first electromagnetic wirings extending in the second direction, and each of the plurality of second electromagnetic induction coil includes at least two second electromagnetic wirings extending in the first direction; wherein the metal wiring layer comprises a first wiring layer and a second wiring layer, the first wiring layer comprises the plurality of first electromagnetic induction coils and the plurality of first light-emitting signal lines, and the second wiring layer comprises the plurality of second electromagnetic induction coils; and
a plurality of light-emitting devices spaced on the metal wiring layer, wherein the first light-emitting signal lines are electrically connected to the light-emitting devices; wherein the metal wiring layer comprises a plurality of wiring units, wherein each of the plurality of wiring units is an area enclosed by two first electromagnetic wirings close to a same side edge of the display module in two adjacent first electromagnetic induction coils and two second electromagnetic wirings close to the same side edge of the display module in two adjacent second electromagnetic induction coils; wherein the first wiring layer comprises a first gap, and the first gap is disposed between adjacent metal wiring lines; and wherein in the wiring unit, a ratio of an area of the first gap to an area of the wiring unit is greater than 1%.

A mobile terminal is provided, wherein the mobile terminal includes the display module;
wherein the display module comprises a light-emitting backplane, and the light-emitting backplane comprises:
a substrate;
a metal wiring layer disposed on the substrate, wherein the metal wiring layer comprises a plurality of metal wiring lines, the plurality of metal wiring lines comprises a plurality of first electromagnetic induction coils arranged in a first direction, a plurality of second electromagnetic induction coils arranged in a second direction, and a plurality of light-emitting signal lines; wherein the plurality of light-emitting signal lines comprises a plurality of first light-emitting signal lines; wherein each of the plurality of first electromagnetic induction coils comprises at least two first electromagnetic wirings extending in the second direction, and each of the plurality of second electromagnetic induction coil includes at least two second electromagnetic wirings extending in the first direction; wherein the metal wiring layer comprises a first wiring layer and a second wiring layer, the first wiring layer comprises the plurality of first electromagnetic induction coils and the plurality of first light-emitting signal lines, and the second wiring layer comprises the plurality of second electromagnetic induction coils; and a plurality of light-emitting devices spaced on the metal wiring layer, wherein the first light-emitting signal lines are electrically connected to the light-emitting devices; wherein the metal wiring layer comprises a plurality of wiring units, wherein each of the plurality of wiring units is an area enclosed by two first electromagnetic wirings close to a same side edge of the display module in two adjacent first electromagnetic induction coils and two second electromagnetic wirings close to the same side edge of the display module in two adjacent second electromagnetic induction coils; wherein the first wiring layer comprises a first gap, and the first gap is disposed between adjacent metal wiring lines; and wherein in the wiring unit, a ratio of an area of the first gap to an area of the wiring unit is greater than 1%.

The present application provides a display module including a light-emitting backplane, wherein the light-emitting backplane includes a substrate, a metal wiring layer disposed on the substrate, and a plurality of light-emitting devices disposed on the metal wiring layer. A metal wiring of the metal wiring layer includes a plurality of first electromagnetic induction coils, a plurality of second electromagnetic induction coils, and a plurality of light-emitting signal lines. The metal wiring layer includes a first wiring layer including the plurality of first electromagnetic induction coils and the plurality of first light-emitting signal lines, and a second wiring layer including the plurality of second electromagnetic induction coils. The metal wiring layer includes a plurality of wiring units, wherein each of the wiring units is an area enclosed by two first electromagnetic wirings close to a same side edge of the display module in two adjacent first electromagnetic induction coils and two second electromagnetic wirings close to a same side edge of the display module in two adjacent second electromagnetic induction coils. The first wiring layer includes a first gap between adjacent metal wiring lines. In the wiring unit, the ratio of the area of the first gap to the area of the wiring unit is set to be greater than 1%, so that the electromagnetic induction signal generated by the second electromagnetic induction coil of the second wiring layer is not shielded, and the metal wirings on the first wiring layer is too dense to form a whole metal layer. The display module having the touch control function has a smaller space after combining the EMR and the light-emitting backplane, and the electromagnetic induction range of the electromagnetic induction signal EIS of the touch control display panel is not affected. As such, the touch control range of the touch control display module after combining the EMR and the light-emitting backplane is effectively increased, and the touch control accuracy of the touch control display module is improved.

Figure 1:
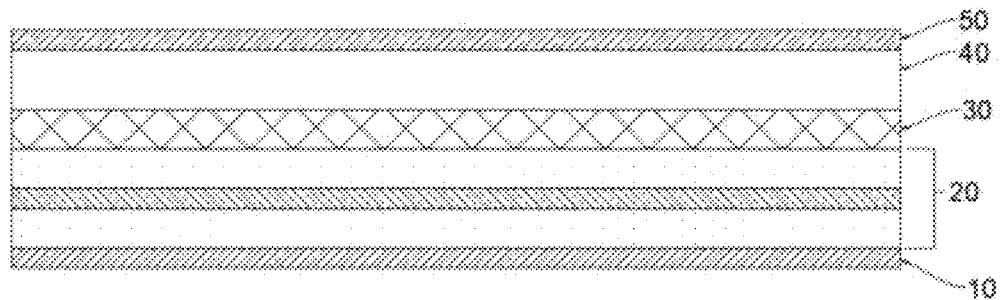
FIG. 1 is a schematic diagram of a film layer of a display module according to an embodiment of the present application.

REFERENCE NUMERALS substrate 10, metal wiring layer 20, light-emitting device layer 30, display panel 40, cover plate 50, touch member 60, drive circuit layer 70, drive circuit 701;

first wiring layer 201, second wiring layer 202, insulating layer 203, flat layer 2031, inorganic insulating layer 2032, third wiring layer 204, first gap 201B, second gap 202B, third gap 203B, wiring unit S, first electromagnetic induction coil M11, second electromagnetic induction coil M21, first electromagnetic wiring M1, second electromagnetic wiring M2, light-emitting signal line L, first light-emitting signal line L1, second light-emitting signal line L2, third light-emitting signal line L3, first direction X, second direction Y, electromagnetic induction signal EIS, connection hole CH, first side a, second side b, third side c, fourth side d, first end portion, second end portion D2, third end portion D3, and fourth end portion D4.

DESCRIPTION OF SPECIFIC EMBODIMENTS OF THE INVENTION

The technical solutions in the embodiments of the present application is clearly and completely described following in connection with the accompanying drawings. It should be understood that the described embodiments are merely a part of the embodiments of the present application, rather than all the embodiments. Based on the embodiments in the present application, all other embodiments obtained by a person skilled in the art without involving any inventive effort are within the scope of the present application.

The embodiment of the application provides a display module and a mobile terminal. Detailed descriptions are given below. It should be noted that the order in which the following examples are described is not intended to limit the preferred order of the examples. Additionally, in the description herein, the term "including" means "including, but not limited to." The terms first, second, third, and the like are used merely as indications and do not impose numerical requirements or order of establishment. Various embodiments of the present application may exist in a format with one range. It should be understood that the description in a format with one range is merely for convenience and brevity and should not be construed as a hard limitation on the scope of the application. Accordingly, it is to be considered that the description of the range has specifically disclosed all possible subranges, as well as a single numerical value within that range. For example, it should be considered that a range from 1 to 6 is described having specifically disclosed subranges, e.g., from 1 to 3, from 1 to 4, from 1 to 5, from 2 to 4, from 2 to 6, from 3 to 6, etc., and that a single number within the range, e.g., 1, 2, 3, 4, 5, and 6, is applicable regardless of the range. Additionally, whenever a range of values is indicated herein, it is meant to include any number (fractional or integer) within the indicated range.

Referring to FIG. 1 to FIG. 4, an embodiment of the present application provides a display module including a light-emitting backplane. The light-emitting backplane includes:

a substrate 10;
a metal wiring layer 20 provided on the substrate 10, wherein the metal wiring layer 20 includes a plurality of metal wiring lines, the plurality of metal wiring lines includes a plurality of first electromagnetic induction coils M11 arranged in a first direction X, a plurality of second electromagnetic induction coils M21 arranged in a second direction Y, and a plurality of light-emitting signal lines L;
wherein the plurality of light-emitting signal lines L includes a plurality of first light-emitting signal lines L1, the first electromagnetic induction coil M11 includes at least two first electromagnetic wirings M1 extending in the second direction Y, and the second electromagnetic induction coil M21 includes at least two second electromagnetic wirings M2 extending in the first direction X;
wherein the metal wiring layer 20 includes a first wiring layer 201 and a second wiring layer 202, the first wiring layer 201 and the second wiring layer 202 are stacked and are insulated from each other; wherein the first wiring layer 201 includes the plurality of first electromagnetic induction coils M11 and the plurality of first light-emitting signal lines L1; wherein the second wiring layer 202 includes the plurality of second electromagnetic induction coils M21; and
a plurality of light-emitting devices spaced on the metal wiring layer 20, wherein the light-emitting signal lines L are electrically connected to the plurality of light-emitting devices;
wherein the metal wiring layer 20 includes a plurality of wiring units S, each of the plurality of wiring units S is an area enclosed by two first electromagnetic wirings M1 close to a same side edge of the display module in two adjacent first electromagnetic induction coils M11 and two second electromagnetic wirings M2 close to a same side edge of the display module in two adjacent second electromagnetic induction coils M21; wherein the first wiring layer 201 includes a first gap 201B between adjacent metal wiring lines; and a ratio of an area of the first gap 201B to an area of the wiring unit S is greater than 1% in the wiring unit S.

It should be noted that, in order to further reduce the thickness of the display module, the display module is thinned by combining the EMR technology with the light-emitting backplane of the display panel. However, in this technical solution, the wiring arrangement density of the wiring layer is easy to be excessively large, and a metal film (that is, a metal film layer in which the electromagnetic wiring and the light-emitting signal wiring are closely formed) is formed on the entire surface. The metal film has a shielding effect on the electromagnetic signal, and influences the range and density of the electromagnetic induction signal of the electromagnetic induction coils above or below the metal film. Therefore, the touch control display module thinned by combining the EMR technology with the light-emitting backplane of the display panel is prone to a problem that the touch control range is narrow and the touch control accuracy is not high.

In order to solve the above-mentioned technical problem, the present embodiment includes a plurality of metal wirings. The plurality of metal wirings includes a plurality of first electromagnetic induction coils M11 arranged in a first direction X, a plurality of second electromagnetic induction coils M21 arranged in a second direction Y, and a plurality of light-emitting signal lines L.

The first electromagnetic induction coil M11 includes at least two first electromagnetic wirings M1 extending in the second direction Y (the currents in the two first electromagnetic wirings M1 are in opposite directions), and the second electromagnetic induction coil M21 includes at least two second electromagnetic wirings M2 extending in the first direction X (the currents in the two second electromagnetic wirings M2 are in opposite directions).

The metal wiring layer 20 includes a first wiring layer 201 and a second wiring layer 202, wherein the first electromagnetic induction coil M11 is disposed on the first wiring layer 201, the second electromagnetic induction coil M21 is disposed on the second wiring layer 202, the first electromagnetic induction coil M11 and the second electromagnetic induction coil M21 are disposed on different layers, and the first light-emitting signal line L1 is further disposed in the first wiring layer 201.

The wiring unit S is an area enclosed by two first electromagnetic wirings M1 close to a same side edge of the display module in two adjacent first electromagnetic induction coils M11 and two second electromagnetic wirings M2 close to a same side edge of the display module in two adjacent second electromagnetic induction coils M21.

The first electromagnetic induction coil M11 and the first light-emitting signal line L1 in the first wiring layer 201 are closely arranged, and the first wiring layer 201 is further provided with a first gap 201B. The first gap 201B is an empty area between adjacent metal wirings in the wiring unit S. The ratio of the area of the first gap 201B to the area of the wiring unit S is set to be greater than 1% in the wiring unit S, so that there is no complete metal film on the side surface (a side surface toward or away from a side of the substrate 10, in this embodiment, a side surface close to the substrate 10) of the second electromagnetic induction coil M21. The electromagnetic induction signal EIS generated by the second electromagnetic induction coil M21 penetrates the first wiring layer 201 through the first gap 201B, thereby effectively enlarging the touch control range of the integrated display module and improving the touch control accuracy of the display module.

Figure 2:
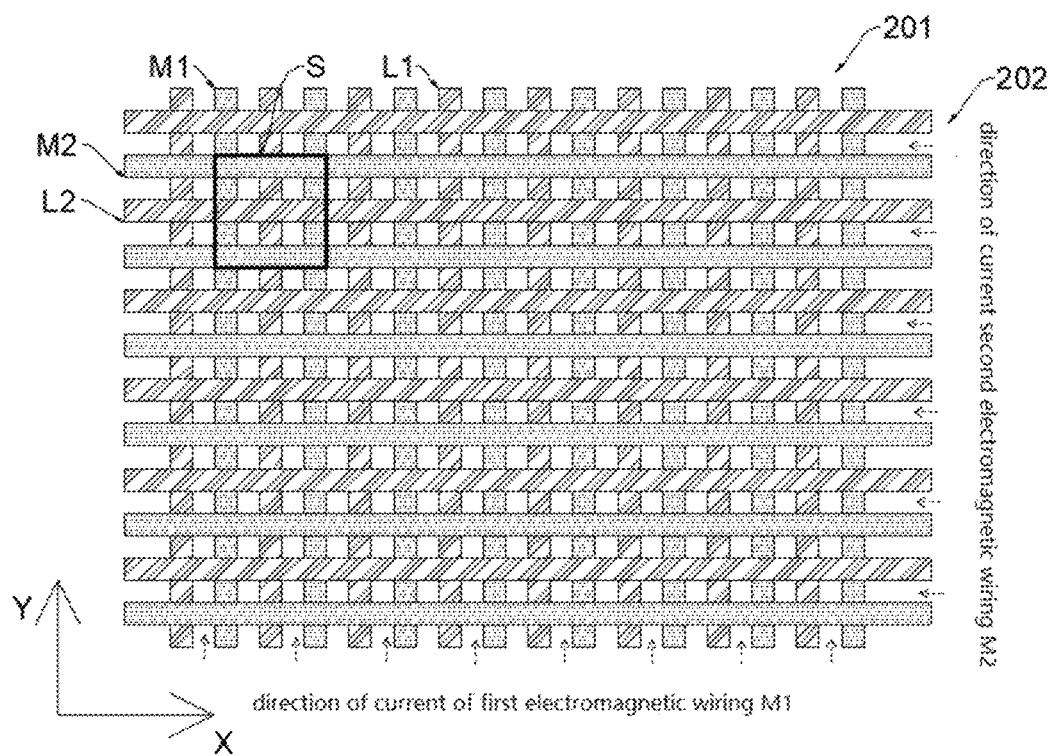
FIG. 2 is a schematic structural diagram of a metal wiring layer of a display module according to an embodiment of the present application.

Specifically, as shown in FIG. 1 and FIG. 2, the display module includes a substrate 10, a metal wiring layer 20 disposed on the substrate 10, a light-emitting device layer 30 disposed on the metal wiring layer 20, a display panel 40 disposed on the light-emitting device layer 30, and a cover plate 50 disposed on the display panel 40. In other embodiments of the present application, the cover plate 50 may not be provided, and is not limited herein.

Specifically, the substrate 10 may be a glass substrate 10, or the material of the substrate 10 may be at least one of organic polymer materials: glass, polyimide, polymethyl methacrylate, polyethylene terephthalate, polycarbonate, polyethylene naphthalate, or cyclic olefin copolymer. In this embodiment, the substrate 10 is a composite substrate including a glass substrate and a buffer layer disposed on the glass substrate. The metal wiring layer 20 is disposed on the buffer layer, and a thickness of the wiring layer (metal wiring only) in the metal wiring layer 20 is greater than or equal to 0.5 μm, and less than or equal to 3 μm.

Figure 5:
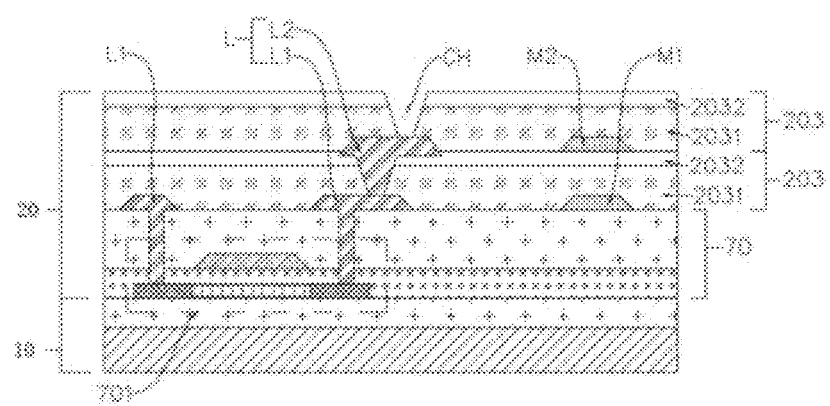
FIG. 5 is a schematic structural diagram of a light-emitting backplane of a display module according to an embodiment of the present application.

Specifically, as shown in FIG. 5, the metal wiring layer 20 includes at least two wiring layers arranged in a stack, and an insulating layer 203 between the wiring layers for insulation. In this embodiment, the metal wiring layer 20 at least includes a first wiring layer 201, a second wiring layer 202, and an insulating layer 203 disposed on the first wiring layer 201 and the second wiring layer 202. In other examples, the metal wiring layer 20 may further include a third wiring layer 204, a fourth wiring layer, and the like, which is provided according to an actual wiring requirement of the light-emitting backplane. It may be provided with a plurality of wiring layers to effectively reduce the impedance of the metal wiring (especially the light-emitting signal line L). However, the thickness of the backlight module opposite is also increased, which need to be adjusted according to actual production requirements. The present embodiment is described by using the provision of the two wiring layers as an example.

Specifically, the second wiring layer 202 may be provided on a side of the first wiring layer 201 close to the substrate 10, or may be provided on a side of the first wiring layer 201 away from the substrate 10, which is not specifically limited.

Figure 6:
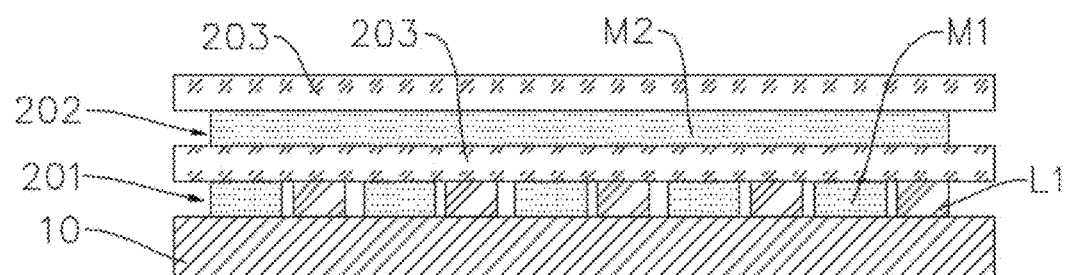
FIG. 6 is a schematic structural diagram of a first-direction cross-section of a light-emitting backplane of a display module according to an embodiment of the present application.
Figure 7:
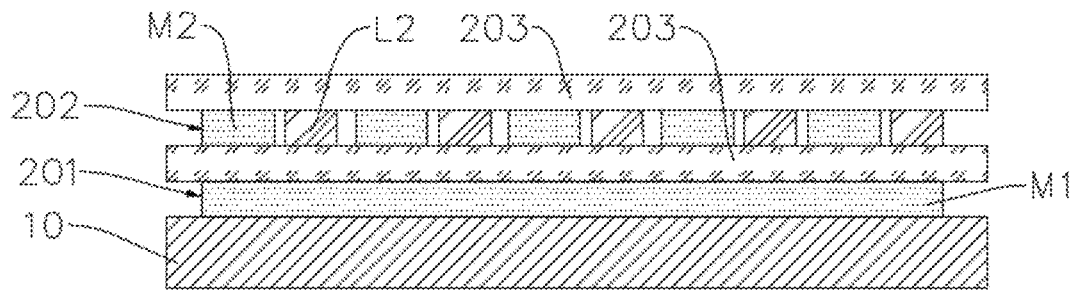
FIG. 7 is a schematic structural diagram of a second-direction cross-section of a light-emitting backplane of a display module according to an embodiment of the present application.

As shown in FIG. 6 and FIG. 7, the second wiring layer 202 is provided on the side of the first wiring layer 201 away from the substrate 10.

Specifically, as shown in FIG. 6 and FIG. 7, the insulating layer 203 may include a flat layer 2031 and an inorganic insulating layer 2032 disposed on the flat layer.

Specifically, the metal wiring layer 20 includes a plurality of metal wiring lines. The plurality of metal wiring lines includes a plurality of first electromagnetic induction coils M11 arranged in the first direction X, a plurality of second electromagnetic induction coils M21 arranged in the second direction Y, and a plurality of light-emitting signal lines L. The first electromagnetic induction coil M11 and the second electromagnetic induction coil M21 are provided in different layers, and the plurality of metal wirings may include a driving voltage line, a data line, and the like, which are not limited herein.

Specifically, the first electromagnetic induction coil M11 at least includes two first electromagnetic wirings M1 extending in the second direction Y, and the second electromagnetic induction coil M21 at least includes two second electromagnetic wirings M2 extending in the first direction X.

Specifically, the first direction X intersects the second direction Y. An included angle between the first direction X and the second direction Y is preferably 90°. The included angle may be 30°, 45°, and 60°, which is not limited herein.

Figure 19:
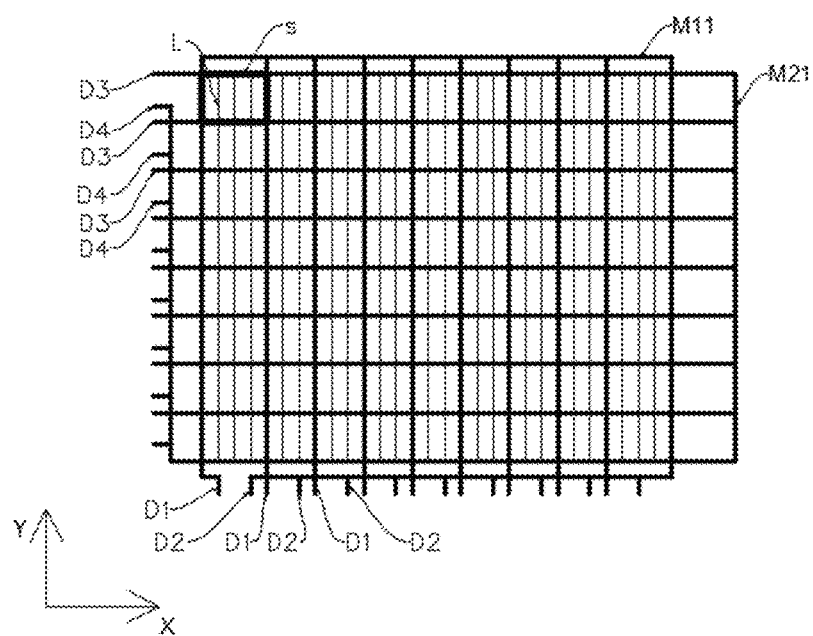
FIG. 19 is a schematic diagram of a winding structure of a first electromagnetic induction coil and a second electromagnetic induction coil of a display module according to an embodiment of the present application.

Further, as shown in FIG. 19, the display module includes a touch area, and each of the first electromagnetic induction coils M11 includes a first end portion D1, a second end portion D2, and a first winding portion in the touch area and connected between the first end portion D1 and the second end portion D2. The first winding portion includes two first electromagnetic wirings M1 extending in the second direction Y, and two first connecting electromagnetic wirings. The first electromagnetic induction coils M11 is formed by connecting connection sequentially the first end portion D1, the first electromagnetic wiring M1, the first connecting electromagnetic wiring, the first connection electromagnetic wiring M1, the first connecting electromagnetic wiring, and the second end portion D2. In the present embodiment, a single-turn electromagnetic induction coil is used as an example. In practice, the first electromagnetic induction coil M11 may be a multi-turn electromagnetic induction coil, the first end portion D1 may be a signal input terminal, the second end portion D2 is a signal output terminal, and the current flows from the first end portion D1 to the second end portion D2.

Each of the second electromagnetic induction coils M21 includes a third end portion D3, a fourth end portion D4, and a second winding portion in the touch area and connected between the third end portion D3 and the fourth end portion D4. The second winding portion includes two second electromagnetic wirings M2 extending in the first direction X, and two second connecting electromagnetic wirings. The second electromagnetic induction coil M21 is formed by connecting connection sequentially the third end portion D3, the second electromagnetic wiring M2, the second connecting electromagnetic wiring, the second electromagnetic wiring M2, the second connecting electromagnetic wiring, and a fourth end portion D4. In this embodiment, a single-turn electromagnetic induction coil is used as an example. In practice, the second electromagnetic induction coil M21 may be a multi-turn electromagnetic induction coil, the third end portion D3 may be a signal input end, the fourth end portion D4 is a signal output end, and the current flows from the third end portion D3 to the fourth end portion D4.

It should be noted that by sensing changes in the magnetic flux in electromagnetic induction coils at different positions of the display module, the coordinates of the touching positions at the display module can be obtained, so that the display module has a better touch effect and a higher touch precision. At the same time, since the substrate 10 of the light-emitting backplane does not need to be light-transmitting, there is a large amount of space for wiring the electromagnetic induction coils, the light-emitting function of the light-emitting backplane is not affected, and the thickness of the display module integrated with the touch control function can be effectively reduced.

Specifically, the direction and the manner on wiring the first light-emitting signal line L1 on the first wiring layer 201 are not limited, and the first light-emitting signal line L1 is provided on the peripheral side of the light-emitting device. The manner on wiring the first light-emitting signal line L1 may be in a straight line or may be in a bent line, which is adjusted according to actual production conditions. In this embodiment, the first light-emitting signal line L1 is electrically connected to the light-emitting device.

Specifically, the material of the first electromagnetic induction coil M11, the second electromagnetic induction coil M21, or the light-emitting signal line L is a conductive material, preferably a metal or alloy, such as copper, aluminum, silver, or an alloy thereof. The thickness of the metal wiring may be greater than or equal to 0.5 um, and less than or equal to 3 um.

Specifically, the metal wiring layer further includes a drive circuit layer 70 disposed on the substrate 10, and the first wiring layer 201 is disposed on aside of the drive circuit layer 70 away from the substrate 10. The drive circuit layer 70 includes a plurality of drive circuits 701, and each of the light-emitting signal lines L is electrically connected to corresponding drive circuit 701. The drive circuits 701 control the light-emitting devices through the light-emitting signal lines L to emit light.

Specifically, the light-emitting device layer 30 is provided on the metal wiring layer 20, the light-emitting device layer 30 includes a plurality of light-emitting devices, the light-emitting devices may be mini LED or Micro-LED. The light-emitting devices are electrically connected to the light-emitting signal lines L correspondingly. The extension paths of the first electromagnetic induction coils M11 and the second electromagnetic induction coils M21 may be provided between adjacent light-emitting devices, which is not limited herein.

Specifically, the metal wiring layer 20 includes a plurality of wiring units S, each of the plurality of wiring units S is an area enclosed by two first electromagnetic wirings M1 close to a same side edge of the display module in two adjacent first electromagnetic induction coils M11 and two second electromagnetic wirings M2 close to a same side edge of the display module in two adjacent second electromagnetic induction coils M21. The above arrangement includes the following embodiments.

The wiring unit S may be specifically an area enclosed by two first electromagnetic wirings M1 close to the corresponding first end D1 in two adjacent first electromagnetic induction coils M11 and two second electromagnetic wirings M2 close to the corresponding third end D3 in two adjacent second electromagnetic induction coils M21.

Alternatively, the wiring unit S may be specifically an area enclosed by two first electromagnetic wirings M1 close to the corresponding second end D2 in two adjacent first electromagnetic induction coils M11 and two second electromagnetic wirings M2 close to the corresponding fourth end D4 in two adjacent second electromagnetic induction coils M21.

Alternatively, the wiring unit S may be specifically an area enclosed by two first electromagnetic wirings M1 close to the corresponding first end D1 in two adjacent first electromagnetic induction coils M11 and two second electromagnetic wirings M2 close to the corresponding fourth end D4 in two adjacent second electromagnetic induction coils M21.

Alternatively, the wiring unit S may be specifically an area enclosed by two first electromagnetic wirings M1 close to the corresponding second end D2 in two adjacent first electromagnetic induction coils M11 and two second electromagnetic wirings M2 close to the corresponding third end D3 in two adjacent second electromagnetic induction coils M21.

It should be noted that, in addition to the first electromagnetic wiring M1 and the second electromagnetic wiring M2 at the edge of the wiring unit S, the wiring unit S also has a plurality of metal wiring, and the metal wirings in the wiring unit S may include a part of the first winding portions of the other first electromagnetic induction coils M11, the light-emitting signal lines, and the like.

In the wiring unit, the first wiring layer 201 includes a first gap 201B, and the first gap 201B is located between adjacent metal wiring lines. That is, the first gap 201B is an empty area between adjacent metal wiring lines. By controlling the size of the gap between adjacent metal wiring lines, and setting the ratio of the area of the first gap 201B to the area of the wiring unit S to be greater than 1%, a metal film layer is prevented from forming on a whole surface of the first wiring layer 201. The electromagnetic induction signal generated by the second electromagnetic induction coil M21 can pass through the first gap 201B, so as to prevent the electromagnetic induction signal EIS generated by the second electromagnetic induction coil M21 from being shielded by the first wiring layer 201.

Specifically, the ratio of the area of the first gap 201B to the area of the wiring unit S may be any one of 1.01%, 1.1%, 1.2%, 1.5%, 2%, 3%, 4%, 5%, 8%, 10%, 50%.

In an embodiment, in a case that the metal wiring layer 20 is a two-layer wiring layer, the ratio of the area of the first gap 201B to the area of the wiring unit S is optionally less than 50%, further optionally less than 10%, further optionally less than 6%, and further optionally less than 2%.

Specifically, the first gap 201B has a plurality of first gaps 201B, and the areas and shapes of the plurality of first gaps 201B may be the same or different.

Specifically, the shape of the first gap 201B is not limited, and may be any one of a square, a circle, a rectangle, a regular pattern, or an irregular pattern. Specifically, the shape of the first gap 201B may be selected according to an actual wiring condition, which is not limited herein.

A display module including a light-emitting backplane is provided, and the light-emitting backplane includes a substrate 10, a metal wiring layer 20 disposed on the substrate 10, a plurality of light-emitting devices disposed on the metal wiring layer 20. Metal wirings of the metal wiring layer 20 include a plurality of first electromagnetic induction coils M11, a plurality of second electromagnetic induction coils M21, and a plurality of first light-emitting signal lines L1. The metal wiring layer 20 includes a first wiring layer 201 including the plurality of first electromagnetic induction coils M11 and the plurality of first light-emitting signal lines L1, and a second wiring layer 202 including the plurality of second electromagnetic induction coils M21. The metal wiring layer 20 includes a plurality of wiring units S, wherein each of the wiring units S is an area enclosed by two first electromagnetic wirings M1 close to the same side edge of the display module in two adjacent first electromagnetic induction coils M11 and two second electromagnetic wirings M2 close to the same side edge of the display module in two adjacent second electromagnetic induction coils M21. The first wiring layer 201 includes a first gap 201B between adjacent metal wiring lines. In the wiring unit S, the ratio of the area of the first gap 201B to the area of the wiring unit S is set to be greater than 1%, so that the electromagnetic induction signal EIS generated by the second electromagnetic induction coil M21 of the second wiring layer 202 is not shielded, and the metal wirings on the first wiring layer 201 is too dense to form a whole metal layer. The display module having the touch control function has a smaller space after combining the EMR and the light-emitting backplane, and the electromagnetic induction range of the electromagnetic induction signal EIS of the touch control display panel is not affected. As such, the touch control range of the touch control display module after combining the EMR and the light-emitting backplane is effectively increased, and the touch control accuracy of the touch control display module is improved.

Figure 4:
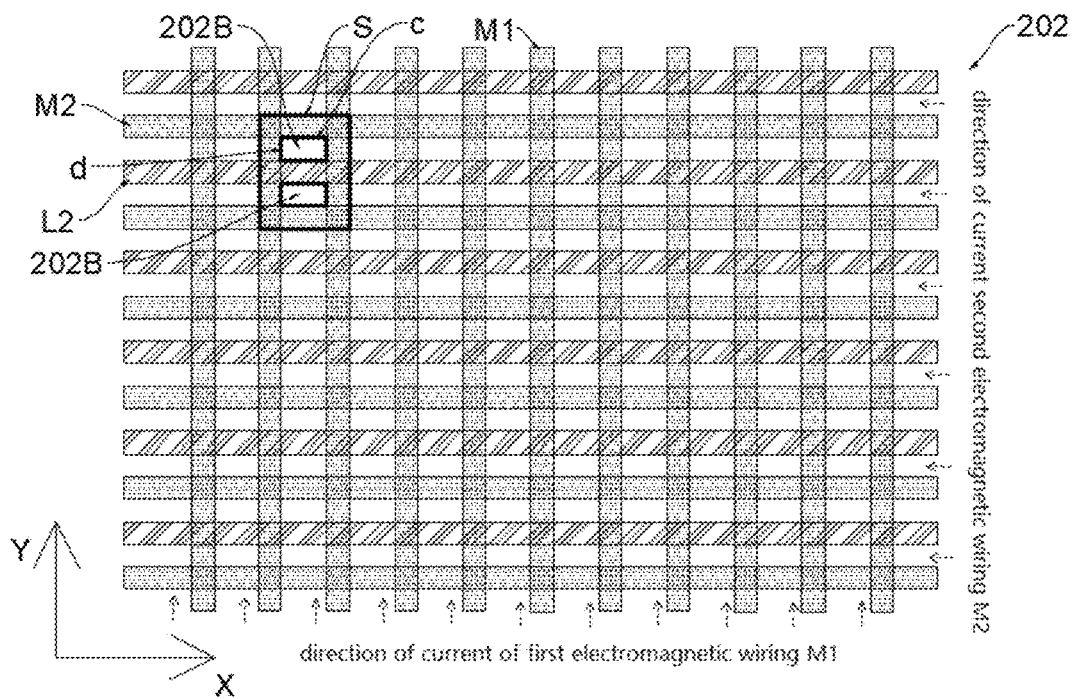
FIG. 4 is a schematic structural diagram of a second wiring layer and a first electromagnetic wiring of a display module according to an embodiment of the present application.

In an embodiment, as shown in FIG. 4, the second wiring layer 202 further includes a plurality of the second light-emitting signal lines L2, and a second gap 202B between adjacent metal wiring lines.

In the wiring unit S, the ratio of the area of the second gap 202B to the area of the wiring unit S is greater than 1%.

Specifically, the direction and the manner on wiring the second light-emitting signal line L2 on the second wiring layer 202 are not limited, and the second light-emitting signal line L2 is provided on the peripheral side of the light-emitting device. The manner on wiring the second light-emitting signal line L2 may be in a straight line or may be in a bent line, which is adjusted according to actual production conditions. In this embodiment, the second light-emitting signal line L2 is electrically connected to the light-emitting device.

Further, as shown in FIG. 5, the second light-emitting signal line L2 is electrically connected to the corresponding light-emitting device through a connection hole CH provided on the insulating layer 203.

Specifically, a through-hole is provided on the insulating layer 203 between the first wiring layer 201 and the second wiring layer 20, and the first light-emitting signal line L1 is electrically connected to the second light-emitting signal line L2 through the through-hole.

Specifically, a connection hole CH is provided on the insulating layer 203 on the second wiring layer 202, and the connection hole CH is provided between the light-emitting device and the second light-emitting signal line L2 for electrically connecting the light-emitting device to the second light-emitting signal line L2.

Specifically, the ratio of the area of the second gap 202B to the area of the wiring unit S may be any one of 1.01%, 1.1%, 1.2%, 1.5%, 2%, 3%, 4%, 5%, 8%, 10%, 50%.

In an embodiment, in a case that the metal wiring layer 20 is a two-layer wiring layer, the ratio of the area of the second gap 2012B to the area of the wiring unit S is optionally less than 50%, further optionally less than 10%, further optionally less than 6%, and further optionally less than 2%.

According to the above-described embodiment, in a case that the first wiring layer 201 includes a first gap 201B, and the second wiring layer 202 includes a second gap 202B, there is at least a partial non-overlapping region between the first gap 201B and the second gap 202B.

Specifically, the light-emitting signal line L in the metal wiring includes a positive-electrode light-emitting signal line and a negative-electrode light-emitting signal line, and the positive-electrode light-emitting signal line and the negative-electrode light-emitting signal line may be provided in the same layer or different layers.

The current on the positive-electrode light-emitting signal line is a positive current and the current on the negative-electrode light-emitting signal line is a negative current. The light-emitting backplane further includes a drive module connected to the plurality of drive circuits 701 of the drive circuit layer 70 for outputting different timing voltage signals to each of the drive circuits 701. The plurality of drive circuits 701 is correspondingly connected to the light-emitting devices of the light-emitting backplane through the positive-electrode light-emitting signal lines or the negative-electrode light-emitting signal lines, for controlling the lighting of the corresponding row of the light-emitting devices based on the timing voltage signals (that is, pulse voltages) output by the drive circuit, specifically referring to FIG. 11 and FIG. 12.

It should be understood that by providing the first wiring layer 201 with the first gap 201B, the second wiring layer 202 with the second gap 202B, the ratio of the area of the first gap 201B in the wiring unit S to the area of the wiring unit S greater than 1%, and the ratio of the area of the second gap 202B in the wiring unit S to the area of the wiring unit S greater than 1%, the first electromagnetic induction coil M11 in the first wiring layer 201 is not shielded due to the dense arrangement of the second electromagnetic induction coil M21 and the light-emitting signal line L in the second wiring layer 202, while the second electromagnetic induction coil M21 in the second wiring layer 202 is not shielded due to the dense arrangement of the first electromagnetic induction coil M11 and the light-emitting signal line L in the first wiring layer 201. Thus, the touch control induction effect of the display module and the touch control induction accuracy is improved. Since the light-emitting signal line L is arranged between the first wiring layer 201 and the second wiring layer 202, the impedance of the light-emitting signal line L can be further reduced.

In an embodiment, in the wiring unit S, the ratio of the area of the first gap 201B on the first routing layer 201 to the area of the wiring unit S is less than or equal to 6%. The ratio of the area of the second gap 202B on the second wiring layer 202 to the area of the wiring unit S is less than or equal to 6%.

It should be noted that, in a case that the area ratio of the first gap 201B on the first wiring layer 201 is too large to cause the wiring space of the first electromagnetic induction coil M11 and the light-emitting signal line L to be too small, the line width of the light-emitting signal lines L driving the light-emitting device to emit light is limited, as such, the light density uniformity of light-emitting devices is significantly reduced, and the normal display of the display panel is affected. Thus, the area ratio of the first gap 201B on the first wiring layer 201 is controlled in a certain range, which is further advantageous for improving the space utilization rate of the display module.

Figure 20:
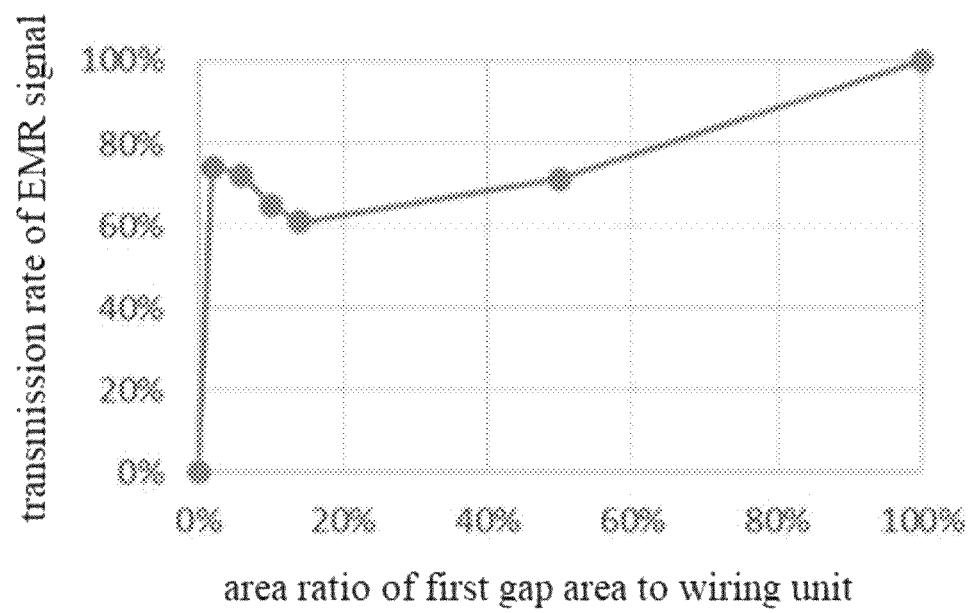
FIG. 20 is a line graph of a ratio of an area of a first gap to an area of the wiring unit versus an electromagnetic induction signal transmittance of a second electromagnetic wiring.

Specifically, as shown in FIG. 14 to FIG. 17, and FIG. 20, referring to the order of FIG. 14, FIG. 15, FIG. 16 and FIG. 17, the second electromagnetic induction coil M21 (taking a single-turn coil as an example) is provided below the first wiring layer 201, and as shown in FIG. 20, the ratio of the area of the first gap 201B in the first wiring layer 201 to the area of the wiring unit S gradually increases. As the area ratio of the first gap 201B gradually increases, the density of the electromagnetic induction signal of the second electromagnetic induction coil M21 firstly increases and then decreases, and a peak value is reached when the ratio of the area of the first gap 201B to the area of the wiring unit S is 2%.

In order to reasonably arrange the metal wirings in the first wiring layer 201, the ratio of the area of the first gap 201B to the area of the wiring unit S may range from 1% to 6%, more preferably from 1% to 2%; wherein the above ranges exclude an end point value of 1%, and the ratio of the area of the first gap 201B to the area of the first wiring layer 201 may be any one of 1.01%, 1.1%, 1.2%, 1.5%, 2%, 3%, 4%, 5%, and 6%.

Specifically, in a case that the ratio of the area of the first gap 201B to the area of the first wiring layer 201 ranges from 1% to 6%, and the end value is not taken as 1%, the utilization rate of the wiring space of the light-emitting backplane and the shielding effect can be well balanced.

Referring specifically to FIG. 20, FIG. 20 is a line graph of the electromagnetic induction density of the second electromagnetic induction coil M21 in the first wiring layer 201 and the opposite second electromagnetic induction coil M21 (single-turn coil) versus the area ratio of the first gap 201B on the first wiring layer 201 in the wiring unit S.

A plurality of samples is collected. In different samples, the area of the first gap 201B of the first wiring layer 201 in the wiring unit S has different ratios with respect to the area of the wiring unit S. Under the same conditions, the transmittance of the electromagnetic induction signal EIS generated by the corresponding second electromagnetic wiring M2 is detected. The following data (Table 1) and a line graph (FIG. 20) are obtained.

TABLE 1

| | area ratio of first gap area to wiring unit | | | | | |
|---|---|---|---|---|---|---|
| | 2% | 6% | 10% | 14% | 50% | 100% |
| Transmission rate of EMR signal | 74% | 72% | 65% | 61% | 71% | 100% |

As shown in FIG. 20, when the area ratio of the first gap area 201B in wiring unit ranges from 0 to 2% (excluding the end value 0), the density of the electromagnetic induction signal EIS gradually increases. When the area ratio of the first gap area 201B in wiring unit ranges from 2% to 6%, the density of the electromagnetic induction signal EIS gradually decreases, and after exceeding 14%, the density of the electromagnetic induction signal EIS gradually increases to the upper limit of 100%.

To ensure the light-emitting signal lines on the light-emitting backplane wired normally, the normal light-emitting of the light-emitting backplane not affected, the touch control effect of the display module good, the touch control range wide, and the touch control accuracy high, the area ratio of the first gap 201B in the wiring unit is reasonably selected to be within 6%. As such, the electromagnetic induction density of the electromagnetic induction coil can be ensured to be more than 72%, and the touch control effect and the space utilization rate of the wiring can be well balanced.

Specifically, the electromagnetic induction signal EIS is an electromagnetic wave. In a case that the first gap 201B or the second gap 202B is small, an interference occurs when the electromagnetic induction signal EIS passes through the first gap 201B or the second gap 202B, thereby increasing the density of the electromagnetic induction signal EIS presented by the corresponding display module. Therefore, when the area ratio of the first gap 201B in the wiring unit S ranges from 0 to 2%, the density of the electromagnetic induction signal EIS presented by the corresponding display module tends to increase. When the area ratio of the first gap 201B in the wiring unit S is more than 2%, the interference reduces, and the density of the electromagnetic induction signal EIS presented by the display module tends to decrease within a certain range.

It should be understood that by rationally limiting the range of the ratio of the area of the first gap 201B to the area of the first wiring layer 201, the wiring arrangement of the light-emitting backplane in the display module can be further optimized. Thus, the space utilization rate is ensured as maximum, the influence of on the electromagnetic induction signal EIS of the touch display module due to an overdense wiring can be effectively prevented after the EMR and the light-emitting backplane are integrated, the touch accuracy of the thin touch display module can be improved, and the touch range of the thin touch display module can be extended.

In an embodiment, in the wiring unit S, the ratio of the area of the first gap 201B to the area of the wiring unit S is equal to the ratio of the area of the second gap 202B to the area of the wiring unit S.

Figure 12:
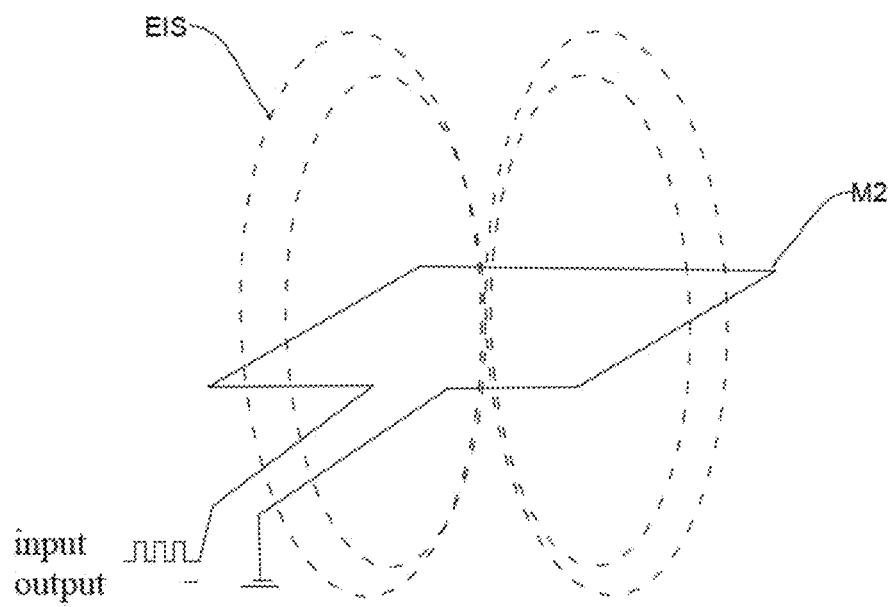
FIG. 12 is a schematic diagram of generating a magnetic induction signal by a second electromagnetic induction coil in a display module according to an embodiment of the present application.
Figure 13:
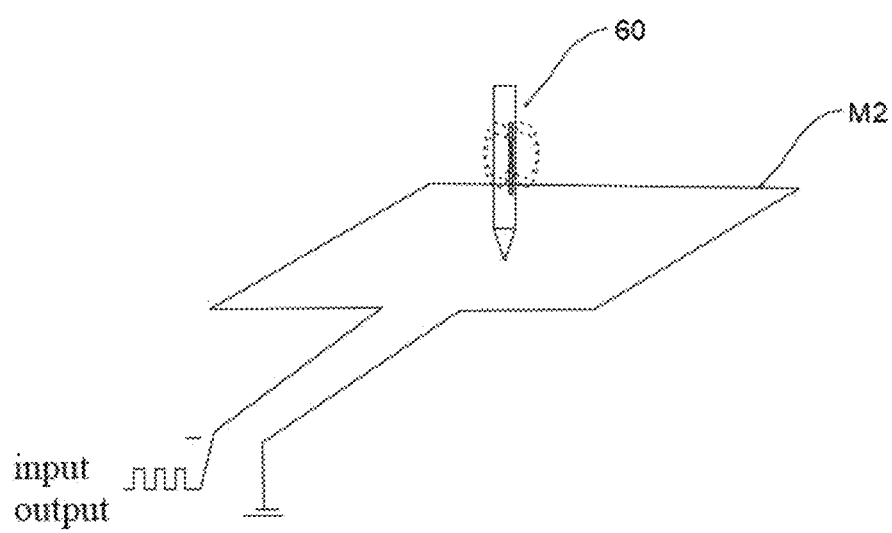
FIG. 13 is a schematic diagram of a display module in which a touch control device generates a magnetic induction signal to a second electromagnetic wire induction coil according to an embodiment of the present application.
Figure 14:
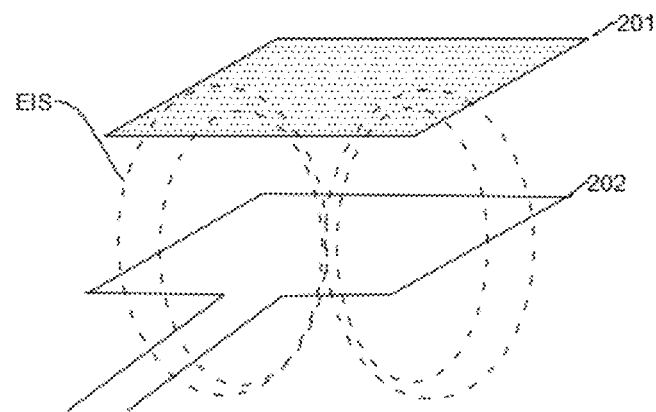
FIG. 14 is a schematic diagram showing shielding effect of a first wiring layer without a first gap on an electromagnetic wiring of a second wiring layer in a display module.
Figure 15:
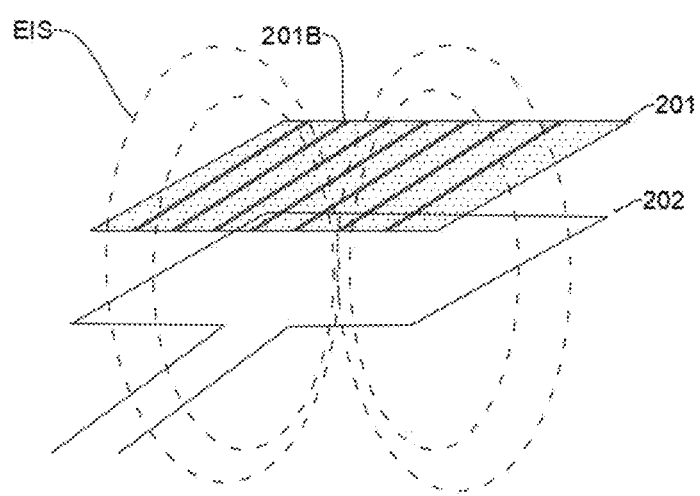
FIGS. 15, 16 and 17 are schematic diagrams showing transmission strength compared an electromagnetic induction signal in a wiring unit with a gradually increased first gap with an electromagnetic induction signal of a second electromagnetic wiring, according to a display module of an embodiment of the present application.
Figure 16:
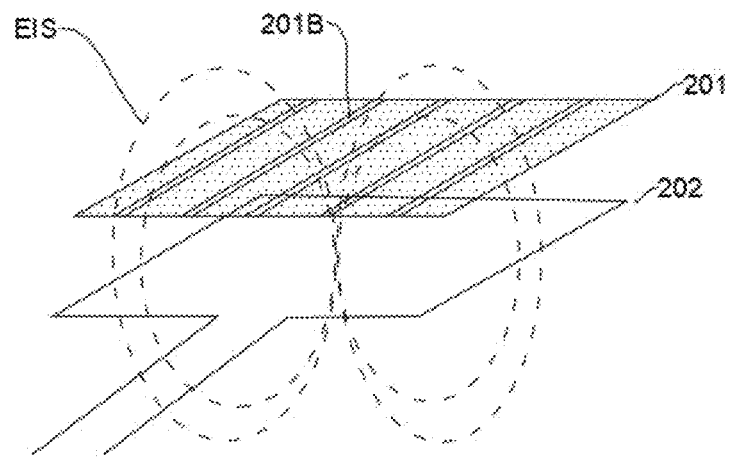

It should be noted that, as shown in FIG. 12 and FIG. 13, the display module according to the embodiment of the present application may further include a touch control 60, such as a stylus, for generating a magnetic field. When the touch control 60 performs touch control, the magnetic flux in an area enclosed by electromagnetic wirings M (specifically, an electromagnetic induction coil) may be changed. When the magnetic flux in the area enclosed by the electromagnetic wirings M (specifically, an electromagnetic induction coil) is changed, the voltage in the electromagnetic induction coil is changed, so that the touch position of the touch control 60 is obtained.

Specifically, the ratio of the area of the first gap 201B to the area of the wiring unit S is equal to the ratio of the area of the second gap 202B to the area of the wiring unit S, so that the density of the electromagnetic induction signal EIS in the second direction Y generated by the first electromagnetic induction coil M11 of the display module is the same as the density of the electromagnetic induction signal EIS in the first direction X generated by the second electromagnetic induction coil M21.

Specifically, in the wiring unit S, the relative position between the first gap 201B and the second gap 202B is not limited, and the number of the first gap 201B and the number of the second gap 202B are not limited. In the wiring unit S, the ratio of the area of the first gap 201B to the area of the wiring unit S is equal to the ratio of the area of the second gap 202B to the area of the wiring unit S. The first gap 201B and the second gap 202B may partially overlap in a direction perpendicular to the substrate 10.

In an embodiment, among the plurality of first electromagnetic induction coils M11 arranged in the first direction X in the display module, the number of windings of the first electromagnetic induction coil M11 close to the edge of the display module is greater than the number of windings of the first electromagnetic induction coil M11 close to the center of the display module. Among the plurality of second electromagnetic induction coils M21 arranged in the second direction Y, the number of windings of the second electromagnetic induction coil M21 close to the edge of the display module is greater than the number of windings of the second electromagnetic induction coil M21 close to the center of the display module.

In Equation $\Phi=nBS$, $\Phi$ indicates the magnetic flux, n indicates the number of windings of the electromagnetic induction coil, B indicates the strength of the generated magnetic field, and S indicates the area enclosed by the electromagnetic induction coils. With B and S unchanged, the number of windings of the electromagnetic induction coil is increased, so that the magnetic flux can be increased and the positioning accuracy of the touch control can be increased.

In order to increase the screen proportion of the display module, the side edge of the display module is generally provided with an arc-shape, so that the side edge needs to cover a larger range to have the same area enclosed by the electromagnetic induction coils. In order not to reduce the touch accuracy, it is necessary to increase the magnetic flux of the side edge of the display module. This can be effectively achieved by increasing the number of windings of the electromagnetic induction coil.

Specifically, the electromagnetic signals generated by the first electromagnetic induction coil M11 and the second electromagnetic induction coil M21 have different directions, and the touch position of the touch control 60 can be accurately positioned based on the changes in the electromagnetic induction signals EIS in different directions.

It should be understood that the ratio of the area of the first gap 201B on the first wiring layer 201 to the area of the wiring unit S is equal to the ratio of the area of the second gap 202B on the second wiring layer 202 to the area of the wiring unit S, so that the density of the electromagnetic induction signal EIS of the touch display panel in the first direction X and the second direction Y is the same, the touch accuracy in the first direction X and the second direction Y is the same, and the touch effect of the display module is better.

Figure 8:
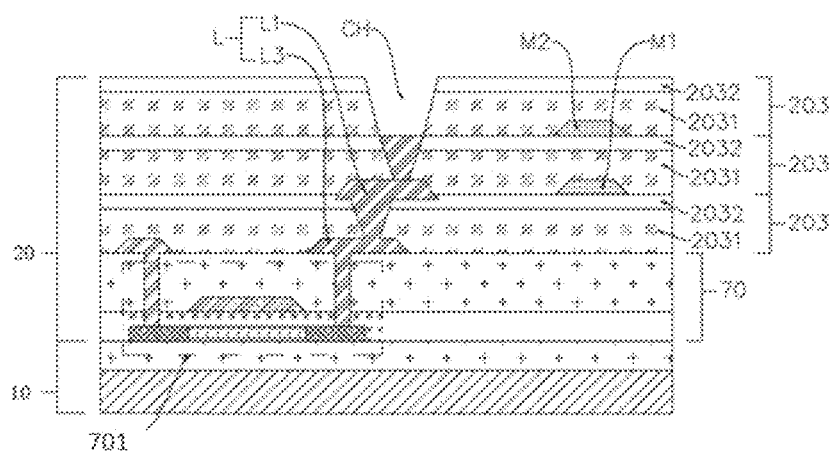
FIG. 8 is a schematic structural diagram of a light-emitting backplane of another display module according to an embodiment of the present application.
Figure 9:
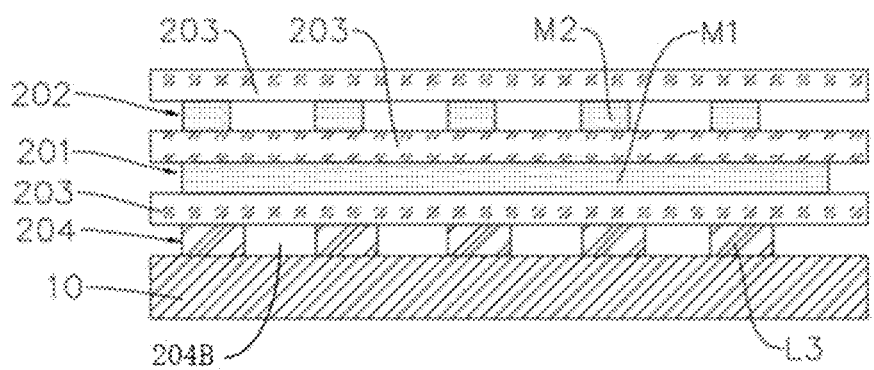
FIG. 9 is a schematic structural diagram of a first-direction cross-section of a light-emitting backplane of another display module according to an embodiment of the present application.
Figure 10:
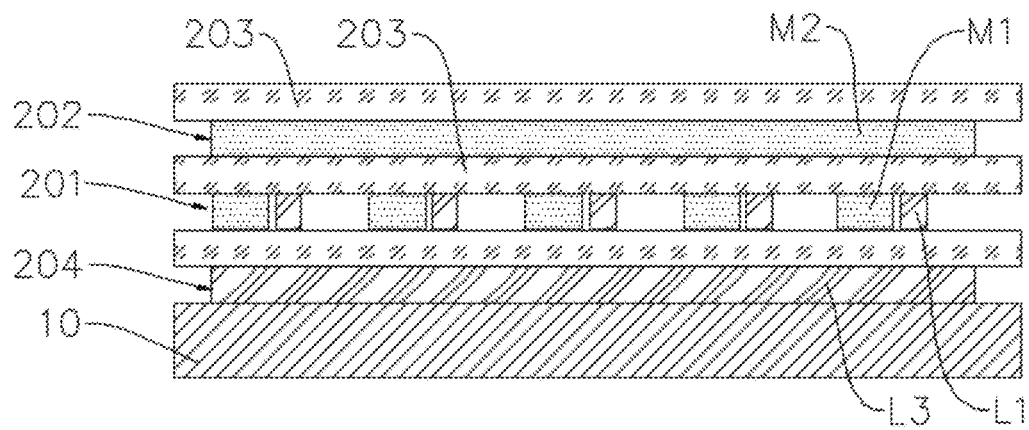
FIG. 10 is a schematic structural diagram of a second-direction cross-section of a light-emitting backplane of another display module according to an embodiment of the present application.

In an embodiment, as shown in FIG. 8 to FIG. 10, the metal wiring layer 20 includes a third wiring layer 204, the plurality of the light-emitting signal lines L further includes a plurality of third light-emitting signal lines L3, and the plurality of the third light-emitting signal lines L3 are disposed over the third wiring layer 204. The third wiring layer 204 includes a third gap 204B between adjacent metal wiring lines.

In the wiring unit S, the ratio of the area of the first gap 201B to the area of the wiring unit S is greater than or equal to 50%, and the ratio of the area of the third gap 204B to the area of the wiring unit S is greater than or equal to 50%.

Specifically, the third wiring layer 204 is disposed on a side of the first wiring layer 201 close to the substrate 10, and the light-emitting signal line L is disposed between the third wiring layer 204 and the first wiring layer 201.

Specifically, the third gap 204B is disposed between adjacent third light-emitting signal lines L3, and an insulating layer 203 is provided between the third wiring layer 204 and the first wiring layer 201. The insulating layer 203 may include a flat layer 2031, and an inorganic insulating layer 2032 disposed on the flat layer. The first wiring layer 201 may be disposed on the inorganic insulating layer 2032.

Specifically, the third wiring layer 204 may also include other metal wirings, such as drive voltage lines, data lines, and the like. The third gap 204B may be located between adjacent metal wirings in the wiring unit S.

Specifically, a through-hole may be provided through the insulating layer 203 between the three wiring layer 204 and the first wiring layer 201, and the first light-emitting signal line L1 may be electrically connected to the third light-emitting signal line L3 through the through-hole.

Specifically, the shape of the third gap 204B is not limited, and may be any one of a square, a circle, a rectangle, a regular pattern, or an irregular pattern. Specifically, the shape of the third gap 204B may be selected according to an actual metal wiring arrangement in the third wiring layer 204, which is not limited herein.

Specifically, the first light-emitting signal line L1 may be denser than the distribution density of the third light-emitting signal line L3, to realize that the ratio of the area of the first gap 201B to the area of the wiring unit S is greater than or equal to 50%, and the ratio of the area of the third gap 204B to the area of the wiring unit S is greater than or equal to 50%, in the wiring unit S.

Specifically, in the wiring unit S, the ratio of the area of the first gap 201B to the area of the wiring unit S is greater than or equal to 50%, and the ratio may be any one of 50%, 51%, 52%, 55%, 60%, or 70%.

Specifically, in the wiring unit S, the ratio of the area of the third gap 204B to the area of the wiring unit S is greater than or equal to 50%, and the may be any one of 50%, 51%, 52%, 55%, 60%, and 70%.

Specifically, the ratio of the area of the first gap 201B to the area of the wiring unit S may be the same as or different from the ratio of the area of the third gap 204B to the area of the wiring unit S, and preferably the ratios are the same.

Specifically, in the wiring unit S, by increasing the ratio of the area of the first gap 201B in the first wiring layer to the area of the wiring unit S, and the ratio of the area of the second gap 202B to the area of the wiring unit S, the throughput of the electromagnetic induction signal EIS is increased and the touch effect is improved. The metal wiring is provided with three layers to provide sufficient space for wiring the light-emitting signal line L.

Figure 11:
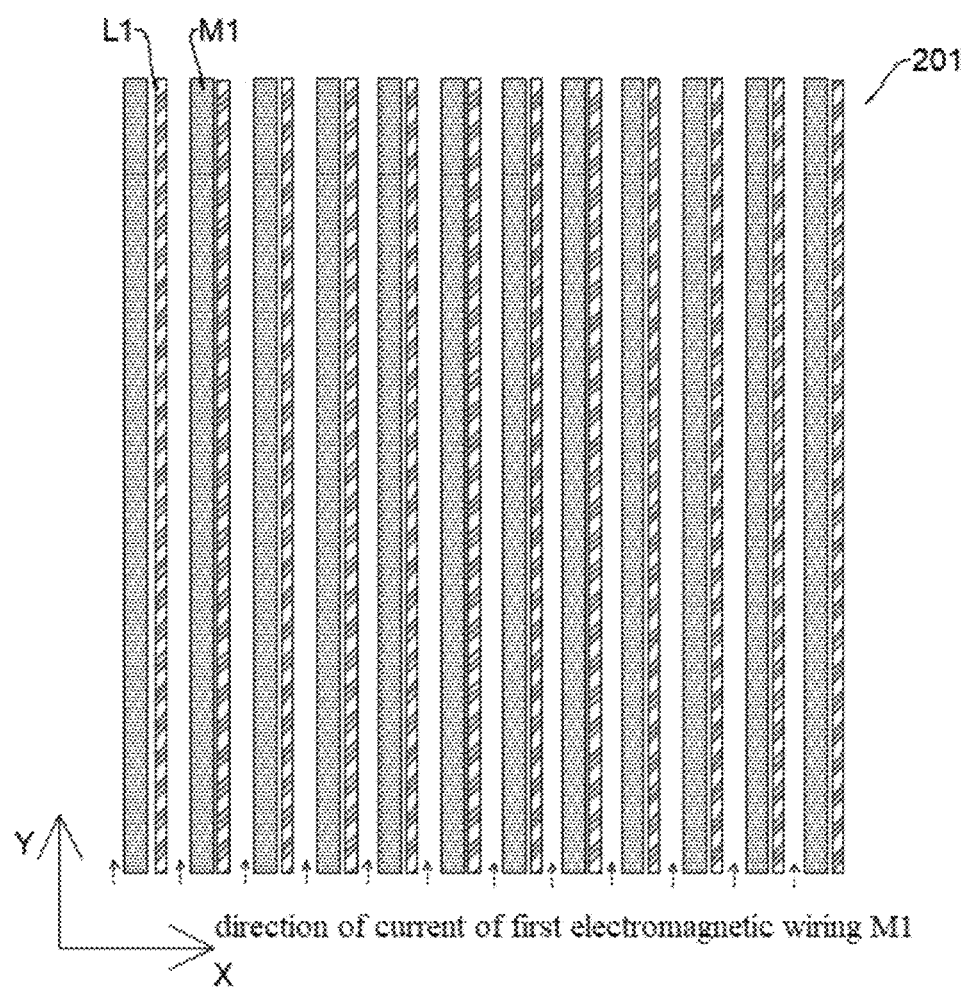
FIG. 11 is a schematic structural diagram of a first wiring layer of another display module according to an embodiment of the present application.

In an embodiment, as shown in FIGS. 10 and 11, the width of the first light-emitting signal line L1 may be set to be less than the width of the third light-emitting signal line L3 so as to realize that the ratio of the area of the first gap 201B to the area of the wiring unit S is greater than or equal to 50%, and the ratio of the area of the third gap 204B to the area of the wiring unit S is greater than or equal to 50%, in the wiring unit S.

It should be understood that providing the metal wiring layer 20 includes the first wiring layer 201, the second wiring layer 202, and the third wiring layer 204, a light-emitting signal line L being distributed between the third wiring layer 204 and the first wiring layer 201, and an electromagnetic wiring line being distributed between the first wiring layer 201 and the second wiring layer 202, the metal wirings can be reasonably distributed over the metal wiring layer, thereby effectively preventing electromagnetic induction signals EIS of the first electromagnetic induction coil M11 and the second electromagnetic induction coil M21 from being shielded due to the closely arrangement on the metal wirings.

In the above embodiments, the insulating layer 203 is provided between the first wiring layer 201 and the second wiring layer 202, the connection hole CH is provided on the insulating layer 203, the connection hole CH is located between the light-emitting device and the first light-emitting signal line L1, and the light-emitting device is electrically connected to the first light-emitting signal line L1 through the connection hole CH.

Specifically, the shape and size of the connection hole CH are not limited, and the position and shape can be adjusted according to actual production requirements.

Figure 3:
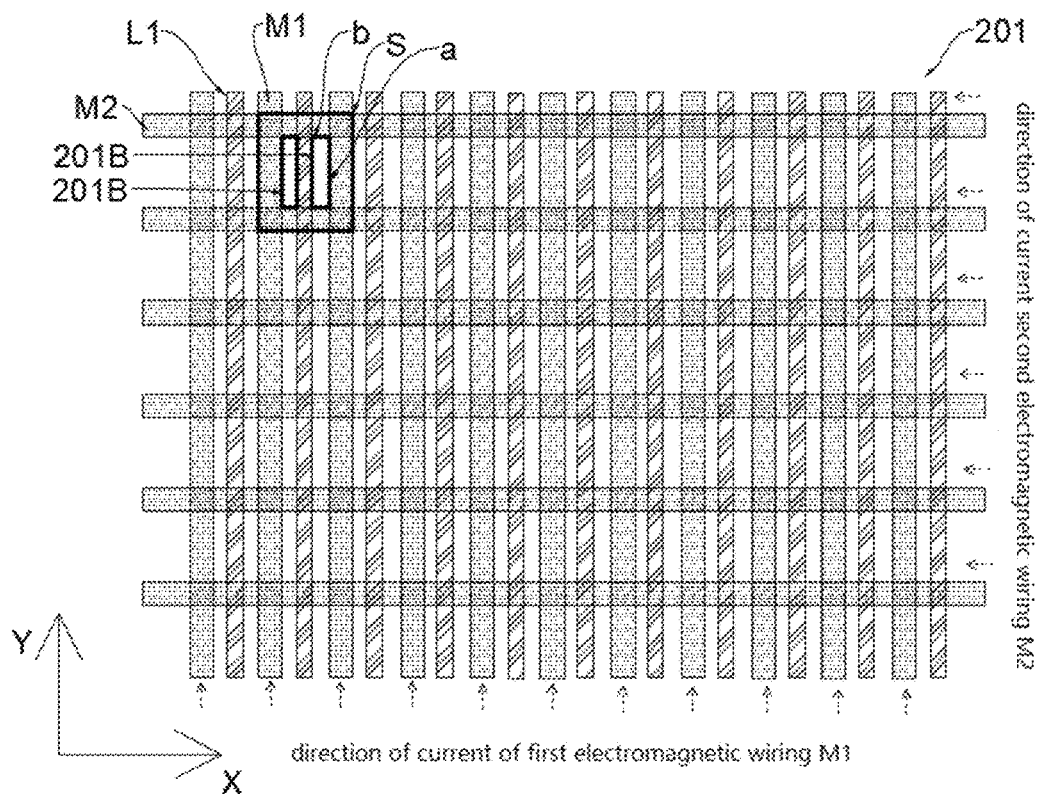
FIG. 3 is a schematic structural diagram of a first wiring layer and a second electromagnetic wiring of a display module according to an embodiment of the present application.

In an embodiment, as shown in FIG. 3, the first gap 201B includes a first side edge a and a second side edge b, the first side edge a is longer than the second side edge b, and the first side edge a extends parallel to the second direction Y.

Specifically, as shown in FIG. 4, the second gap 202B includes a third side edge c and a fourth side edge d, the third side edge c is longer than the fourth side edge d, and the third side edge c extends parallel to the first direction X.

Specifically, most of the metal wirings of the first wiring layer 201 extend in the second direction Y, so that the first gap 201B is rectangular and the long side of the first gap 201B extends parallel to the second direction Y. As such, the electromagnetic induction signal EIS generated by the metal wirings extending in the first direction X to cut the second electromagnetic induction coil M21 is reduced, and the shielding effect of the first wiring layer 201 on the second electromagnetic induction coil M21 is reduced.

Figure 17:
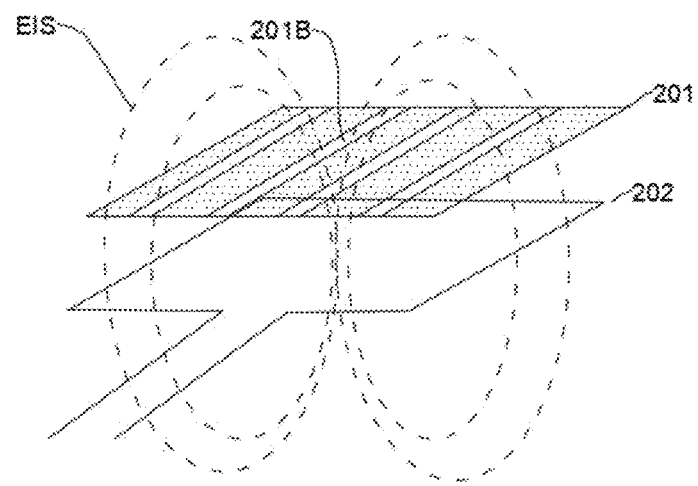
Figure 18:
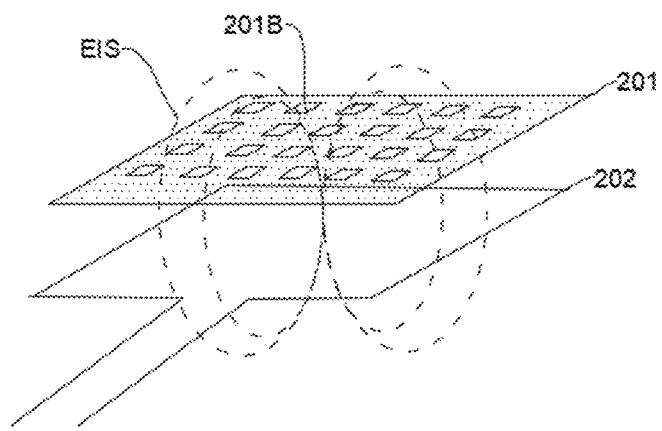
FIG. 18 is a schematic diagram showing a shielding effect on an electromagnetic induction signal of a second electromagnetic wiring when a first gap on a first wiring layer of a display module is an array hole structure according to an embodiment of the present application.

Specifically, in comparison with FIGS. 17 and 18, most of the metal wirings of the second wiring layer 202 extend in the first direction X, so that the second gap 202B is rectangular and the long side of the second gap 202B extends parallel to the first direction X, thereby reducing the electromagnetic induction signal EIS generated by the metal wirings extending in the second direction Y to cut the first electromagnetic induction coil M11, and reducing the shielding effect of the second wiring layer 202 on the first electromagnetic induction coil M11.

In an example, the plurality of first electromagnetic induction coils M11 are equally spaced, the plurality of second electromagnetic induction coils M21 are equally spaced, and the plurality of wiring units S are arrayed on the metal wiring layer 20.

Specifically, the spacing distance between adjacent first electromagnetic induction coils M11 may be equal to the spacing distance between adjacent second electromagnetic induction coils M21.

Specifically, the first electromagnetic induction coils M11 are uniformly distributed on the first wiring layer 201, and the second electromagnetic induction coil M21 are uniformly distributed on the second wiring layer 202, so that the electromagnetic induction density generated by the electromagnetic wiring at each position of the display module is more uniform, the electromagnetic induction signal EIS corresponding to the display module is also uniformly distributed, and the touch accuracy at each position of the display module is uniform, thereby achieving accurate positioning of the touch control 60.

The present application also provides a mobile terminal including a display module described in any of the above embodiments.

Specifically, mobile terminals include, but are not limited to, types of curly or foldable handsets, watches, wristbands, televisions or other wearable displays or touch electronics, as well as flexible smartphones, tablets, notebooks, desktop displays, televisions, smart glasses, smart watches, ATM machines, digital cameras, on-board displays, medical displays, industrial displays, electronic paper books, electrophoretic display devices, gaming machines, double-sided displays, naked-eye 3D displays, mirror display devices, and the like.

The present application provides a display module including a light-emitting backplane, wherein the light-emitting backplane includes a substrate 10, a metal wiring layer 20 disposed on the substrate 10, and a plurality of light-emitting devices disposed on the metal wiring layer 20. A metal wiring of the metal wiring layer 20 includes a plurality of first electromagnetic induction coils M11, a plurality of second electromagnetic induction coils M21, and a plurality of light-emitting signal lines L. The metal wiring layer 20 includes a first wiring layer 201 including the plurality of first electromagnetic induction coils M11 and the plurality of first light-emitting signal lines L1, and a second wiring layer 202 including the plurality of second electromagnetic induction coils M21. The metal wiring layer 20 includes a plurality of wiring units S, wherein each of the wiring units S is an area enclosed by two first electromagnetic wirings M1 close to a same side edge of the display module in two adjacent first electromagnetic induction coils M11 and two second electromagnetic wirings M2 close to a same side edge of the display module in two adjacent second electromagnetic induction coils M21. The first wiring layer 201 includes a first gap 201B between adjacent metal wiring lines. In the wiring unit S, the ratio of the area of the first gap 201B to the area of the wiring unit S is set to be greater than 1%, so that the electromagnetic induction signal EIS generated by the second electromagnetic induction coil M21 of the second wiring layer 202 is not shielded, and the metal wirings on the first wiring layer 201 is too dense to form a whole metal layer. The display module having the touch control function has a smaller space after combining the EMR and the light-emitting backplane, and the electromagnetic induction range of the electromagnetic induction signal EIS of the touch control display panel is not affected. As such, the touch control range of the touch control display module after combining the EMR and the light-emitting backplane is effectively increased, and the touch control accuracy of the touch control display module is improved.

The present application is described in detail with reference to a display module and a mobile terminal according to embodiments of the present application. The principles and embodiments of the present application are described herein using specific examples. The description of the above embodiments is merely provided to help understand the method and the core idea of the present application. At the same time, variations in the detailed embodiments and the scope of application will occur to those skilled in the art in accordance with the teachings of the present application. In view of the foregoing, the present description should not be construed as limiting the application.

The invention claimed is:

1. A display module, comprising a light-emitting backplane, wherein the light-emitting backplane comprises:
   a substrate;
   a metal wiring layer disposed on the substrate, wherein the metal wiring layer comprises a plurality of metal wiring lines, the plurality of metal wiring lines comprises a plurality of first electromagnetic induction coils arranged in a first direction, a plurality of second electromagnetic induction coils arranged in a second direction, and a plurality of light-emitting signal lines; wherein the plurality of light-emitting signal lines comprises a plurality of first light-emitting signal lines; wherein each of the plurality of first electromagnetic induction coils comprises at least two first electromagnetic wirings extending in the second direction, and each of the plurality of second electromagnetic induction coils includes at least two second electromagnetic wirings extending in the first direction; wherein the metal wiring layer comprises a first wiring layer and a second wiring layer, the first wiring layer comprises the plurality of first electromagnetic induction coils and the plurality of first light-emitting signal lines, and the second wiring layer comprises the plurality of second electromagnetic induction coils; and a plurality of light-emitting devices spaced on the metal wiring layer, wherein the first light-emitting signal lines are electrically connected to the light-emitting devices;

wherein the metal wiring layer comprises a plurality of wiring units, wherein each of the plurality of wiring units is an area enclosed by two first electromagnetic wirings of two adjacent first electromagnetic induction coils and two second electromagnetic wirings of two adjacent second electromagnetic induction coils; wherein the first wiring layer comprises a first gap, and the first gap is disposed between adjacent metal wiring lines; and wherein in the each of the plurality of wiring units, a ratio of an area of the first gap to an area of the each of the plurality of wiring units is greater than 1%.

2. The display module of claim 1, wherein the plurality of light-emitting signal lines further comprises a plurality of second light-emitting signal lines, the second wiring layer comprises the plurality of second light-emitting signal lines, the second wiring layer comprises a second gap, and the second gap is disposed between adjacent metal wiring lines;

wherein in the each of the plurality of wiring units, a ratio of an area of the second gap to the area of the each of the plurality of wiring units is greater than 1%.

3. The display module of claim 2, wherein, in the each of the plurality of wiring units, the ratio of the area of the first gap on the first wiring layer to the area of the each of the plurality of wiring units is less than or equal to 6%; and the ratio of the area of the second gap on the second wiring layer to the area of the each of the plurality of wiring units is less than or equal to 6%.

4. The display module of claim 2, wherein, in the each of the plurality of wiring units, the ratio of the area of the first gap to the area of the each of the plurality of wiring units is equal to the ratio of the area of the second gap to the area of the each of the plurality of wiring units.

5. The display module of claim 1, wherein the metal wiring layer further comprises a third wiring layer, the plurality of light-emitting signal lines further comprises a plurality of third light-emitting signal lines, and the plurality of third light-emitting signal lines are distributed in the third wiring layer; wherein the third wiring layer includes a third gap, and the third gap is disposed between adjacent metal wiring lines;

wherein in the each of the plurality of wiring units, the ratio of the area of the first gap to the area of the each of the plurality of wiring units is greater than or equal to 50%, and a ratio of an area of the third gap to the area of the each of the plurality of wiring units is greater than or equal to 50%.

6. The display module of claim 5, wherein an insulating layer is provided between the first wiring layer and the second wiring layer, a connection hole is provided on the insulating layer, the connection hole is disposed between the light-emitting devices and the first light-emitting signal lines, and the light-emitting devices are electrically connected to the first light-emitting signal lines through the connection hole.

7. The display module of claim 5, wherein a width of each of the first light-emitting signal lines is less than a width of each of the third light-emitting signal lines.

8. The display module of claim 1, wherein the display module comprises a touch area; each of the first electromagnetic induction coils comprises a first end portion, a second end portion, and a first winding portion connected between the first end portion and the second end portion; the first winding portion is disposed in the touch area, and the first winding portion comprises two first electromagnetic wirings;

wherein each of the second electromagnetic induction coils comprises a third end portion, a fourth end portion, and a second winding portion connected between the third end portion and the fourth end portion; the second winding portion is disposed in the touch area; and the second winding portion comprises two second electromagnetic wirings;

wherein the each of the plurality of wiring units is an area enclosed by the first electromagnetic wirings of two adjacent first electromagnetic induction coils correspondingly close to the first end portion and the second electromagnetic wirings of two adjacent second electromagnetic induction coils correspondingly close to the corresponding third end portion.

9. The display module of claim 1, wherein the first gap comprises a first side edge and a second side edge, the first side edge is longer than the second side edge, and the first side edge is extended parallel to the second direction.

10. The display module of claim 1, wherein the plurality of the first electromagnetic induction coils are equally spaced, the plurality of the second electromagnetic induction coils are equally spaced, and the plurality of wiring units are arrayed on the metal wiring layer.

11. The display module of claim 1, wherein the display module further comprises a display panel disposed opposite to the light-emitting backplane, and the display panel is disposed on a light-emitting side of the light-emitting backplane.

12. A mobile terminal, comprising a display module;

wherein the display module comprises a light-emitting backplane, and the light-emitting backplane comprises:

a substrate;

a metal wiring layer disposed on the substrate, wherein the metal wiring layer comprises a plurality of metal wiring lines, the plurality of metal wiring lines comprises a plurality of first electromagnetic induction coils arranged in a first direction, a plurality of second electromagnetic induction coils arranged in a second direction, and a plurality of light-emitting signal lines; wherein the plurality of light-emitting signal lines comprises a plurality of first light-emitting signal lines; wherein each of the plurality of first electromagnetic induction coils comprises at least two first electromagnetic wirings extending in the second direction, and each of the plurality of second electromagnetic induction coils includes at least two second electromagnetic wirings extending in the first direction; wherein the metal wiring layer comprises a first wiring layer and a second wiring layer, the first wiring layer comprises the plurality of first electromagnetic induction coils and the plurality of first light-emitting signal lines, and the second wiring layer comprises the plurality of second electromagnetic induction coils; and a plurality of light-emitting devices spaced on the metal wiring layer, wherein the first light-emitting signal lines are electrically connected to the light-emitting devices;

wherein the metal wiring layer comprises a plurality of wiring units, wherein each of the plurality of wiring units is an area enclosed by two first electromagnetic wirings of two adjacent first electromagnetic induction coils and two second electromagnetic wirings of two adjacent second electromagnetic induction coils; wherein the first wiring layer comprises a first gap, and the first gap is disposed between adjacent metal wiring lines; and wherein in the each of the plurality of wiring units, a ratio of an area of the first gap to an area of the each of the plurality of wiring units is greater than 1%.

13. The mobile terminal of claim 12, wherein the plurality of light-emitting signal lines further comprises a plurality of second light-emitting signal lines, the second wiring layer comprises the plurality of second light-emitting signal lines, the second wiring layer comprises a second gap, and the second gap is disposed between adjacent metal wiring lines;

wherein in the each of the plurality of wiring units, a ratio of an area of the second gap to the area of the each of the plurality of wiring units is greater than 1%.

14. The mobile terminal of claim 13, wherein, in the each of the plurality of wiring units, the ratio of the area of the first gap on the first wiring layer to the area of the each of the plurality of wiring units is less than or equal to 6%; and the ratio of the area of the second gap on the second wiring layer to the area of the each of the plurality of wiring units is less than or equal to 6%.

15. The mobile terminal of claim 13, wherein, in the each of the plurality of wiring units, the ratio of the area of the first gap to the area of the each of the plurality of wiring units is equal to the ratio of the area of the second gap to the area of the each of the plurality of wiring units.

16. The mobile terminal of claim 12, wherein the metal wiring layer further comprises a third wiring layer, the plurality of light-emitting signal lines further comprises a plurality of third light-emitting signal lines, and the plurality of third light-emitting signal lines are distributed in the third wiring layer; wherein the third wiring layer includes a third gap, and the third gap is disposed between adjacent metal wiring lines;

wherein in the each of the plurality of wiring units, the ratio of the area of the first gap to the area of the each of the plurality of wiring units is greater than or equal to 50%, and a ratio of an area of the third gap to the area of the each of the plurality of wiring units is greater than or equal to 50%.

17. The mobile terminal of claim 16, wherein an insulating layer is provided between the first wiring layer and the second wiring layer, a connection hole is provided on the insulating layer, the connection hole is disposed between the light-emitting devices and the first light-emitting signal lines, and the light-emitting devices are electrically connected to the first light-emitting signal lines through the connection hole.

18. The mobile terminal of claim 16, wherein a width of each of the first light-emitting signal lines is less than a width of each of the third light-emitting signal lines.

19. The mobile terminal of claim 12, wherein the display module comprises a touch area; each of the first electromagnetic induction coils comprises a first end portion, a second end portion, and a first winding portion connected between the first end portion and the second end portion; the first winding portion is disposed in the touch area, and the first winding portion comprises two first electromagnetic wirings;

wherein each of the second electromagnetic induction coils comprises a third end portion, a fourth end portion, and a second winding portion connected between the third end portion and the fourth end portion; the second winding portion is disposed in the touch area; and the second winding portion comprises two second electromagnetic wirings;

wherein the each of the plurality of wiring units is an area enclosed by the first electromagnetic wirings of two adjacent first electromagnetic induction coils correspondingly close to the first end portion and the second electromagnetic wirings of two adjacent second electromagnetic induction coils correspondingly close to the corresponding third end portion.

20. The mobile terminal according to claim 12, wherein the first gap comprises a first side edge and a second side edge, the first side edge is longer than the second side edge, and the first side edge is extended parallel to the second direction.

* * * * *